Dec. 2, 1930.                E. MILLER                    1,783,254
            AIR MOISTENER FOR INTERNAL COMBUSTION ENGINES
                         Filed Feb. 11, 1929
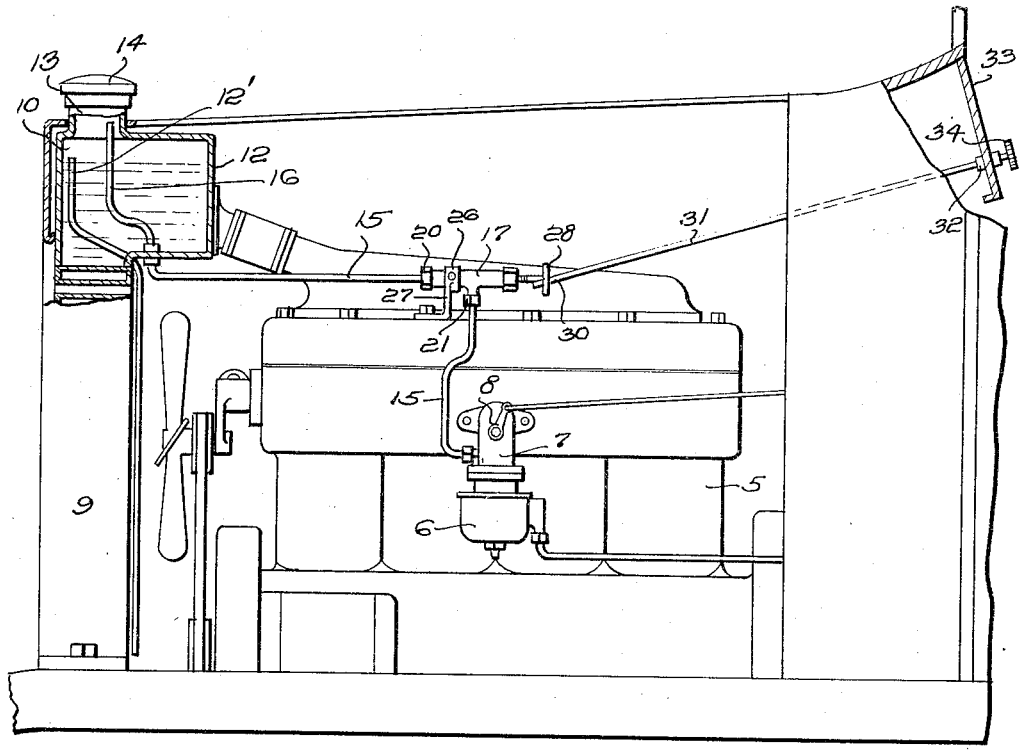
Fig. 1.
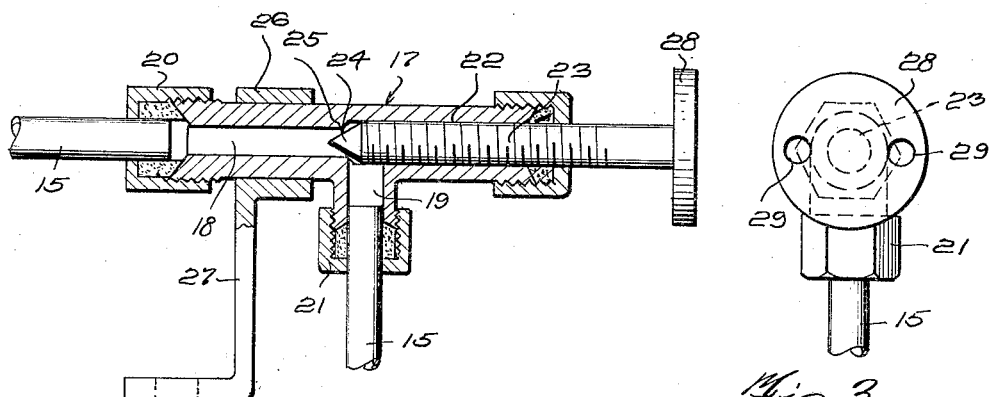
Fig. 2.                                     Fig. 3.
INVENTOR.
ERNEST MILLER,
BY
                    ATTORNEY.

Patented Dec. 2, 1930

1,783,254

UNITED STATES PATENT OFFICE

ERNEST MILLER, OF SAGINAW WEST SIDE, MICHIGAN

AIR MOISTENER FOR INTERNAL-COMBUSTION ENGINES

Application filed February 11, 1929. Serial No. 339,101.

My invention relates to air moisteners for automobile internal combustion engines.

As is well known, an internal combustion engine operates more efficiently upon a damp day, which is due to the fact that the air feeding to the carburetor is laden with moisture.

In accordance with my invention, I provide means to supply to the explosive charge passing from the carburetor air laden with a suitable amount of moisture, whereby the charge which discharges into the cylinders of the engine will contain a desired amount of moisture. In accordance with my invention, I provide the radiator of the automobile with an auxiliary water holding tank, preferably sufficiently large to hold one gallon of water. A tank of this size will supply sufficient water, to produce the moisture laden air, during the operation of the engine for about twenty-four hours. The overflow pipe of the radiator extends into the upper portion of the radiator shell in the usual manner. The moisture supply pipe, included in my invention, leads into the radiator shell or the auxiliary tank, and has its intake end positioned at an elevation well above the intake end of the overflow pipe. By this arrangement, the overflow of water, as when the radiator boils over, will first discharge through the overflow pipe, and will not readily enter the moisture supply pipe. A simple valve structure is connected in the moisture supply pipe and embodies a valve element which is actuated from the dash of the automobile. The valve element of the valve structure may be partly or completely closed, at the will of the driver. It may be completely closed to start the engine in cold weather, and adjusted to the selected open position, to regulate the proper amount of moisture supplied to the explosive charge. The moisture supply pipe leads into the outlet pipe of the carburetor and is connected in this outlet pipe between the spray nozzle of the carburetor and the throttle valve of the carburetor. The construction is extremely simple and reliable in operation.

In the accompanying drawings, forming a part of this specification, and in which like numerals are employed to designate like parts throughout the same, Figure 1 is a side elevation of apparatus embodying my invention, Figure 2 is a central vertical longitudinal section through the valve structure, and, Figure 3 is an end elevation of the same.

In the drawings, wherein for the purpose of illustration, is shown a preferred embodiment of my invention, the numeral 5 designates an internal combustion engine, having a carburetor 6, of any well known or preferred type. This carburetor has an outlet pipe 7, which supplies the explosive charge to the cylinders of the engine. The outlet pipe 7 is equipped with the usual throttle valve 8.

Arranged in advance to the engine, is a radiator 9, of any well known or preferred type, embodying a shell 10, having a rearwardly projecting enlargement or auxiliary tank 12. This tank may be constructed to hold about one gallon of water, to the additional normal capacity of the radiator, and this additional gallon of water is sufficient for the air moistener to operate for about twenty-four hours, without lowering the level of the water within the radiator below a suitable elevation. The numeral 12' designates the usual overflow pipe extending into the shell 10, and terminating near and spaced from the top of the shell. The numeral 13 designates the neck of the radiator shell equipped with a cap 14.

The numeral 15 designates a moisture supply pipe, passing through the bottom of the auxiliary tank 10, and bent upwardly therein, providing a vertical extension 16, the intake end of which preferably projects into the neck 13, and hence is above the maximum elevation of the water within the auxiliary tank 11. The inlet of the moisture supply pipe 15 is disposed at an elevation considerably above the inlet of the overflow pipe 12', and hence the water will not readily enter the moisture supply pipe 15, when the radiator boils over. The outlet end of the pipe 15 leads into the outlet pipe 7 of the carburetor and is connected therein between the spray nozzle of the carburetor and the throttle valve.

A valve structure is connected in the pipe 15 including a T-shaped valve casing 17, having a main longitudinal bore 18 and a transverse bore 19, which are in communication. The end of one section of the pipe 15 is connected with the casing 17, by means of a coupling 20, and is in communication with the bore 18. The end of the other section of the pipe 15 leads into the bore 19 and is connected with the casing 17 by a coupling 21 or the like. The casing 17 is provided with a screw-threaded bore 22, receiving a screw-threaded needle valve 23, the tapered end 24 of which is adapted to co-act with a seat 25, to partly or wholly cover the bore 18, as shown.

The casing 17 is supported by a ring 26, clamped to the same by a set screw or the like, and this ring is carried by a bracket 27, bolted to the cylinder block, as shown. The casing 17 is generally horizontally arranged, near and over the top of the engine.

The needle valve 23 is provided with a disc 28, to turn the same and this disc has apertures 29 to receive the forked end 30 of a turning rod 31, journaled in a bearing 32, mounted upon the dash 33. A knob or disc 34 is rigidly attached to the rear end of the rod 31, and provides means whereby the operator may conveniently turn the rod 31 and hence rotate the needle valve 23.

The operation of the apparatus is as follows:

To start the engine in cold weather, the needle valve 23 is turned so that it closes the bore 18. After the engine is started, the valve 23 is opened, to admit the proper amount of moisture laden air. When the radiator boils over, the major portion of the water will pass through the overflow tube 12', but should any of the water enter the extension 16 of the moisture supply tube, the valve 23 is manually closed. The moisture supply apparatus may be operated for a long period such as twenty-four hours, without unduly lowering the level of the water in the radiator, which is rendered possible by the use of the auxiliary tank 11. At any time during the operation of the device, the supply of moisture to the carburetor may be adjusted or completely cut off, by the driver of the automobile, which is rendered possible by arranging the free end of the rod 31 at the dash. The moisture is supplied to the carburetor at a point between the spray nozzle and the throttle valve.

It is to be understood that the form of my invention, herewith shown and described, is to be taken as a preferred example of the same, and that various changes in the shape, size and arrangement of parts, my be resorted to, without departing from the spirit of my invention, or the scope of the subjoined claims.

Having thus described my invention, I claim:—

1. Means for supplying moisture to the cylinder or cylinders of an automobile engine, comprising a radiator including a shell provided near its top with an auxiliary tank for holding additional water, an overflow pipe for the radiator shell, a moisture supply pipe leading into the auxiliary tank and having its intake end terminating at a substantial elevation above the intake of the overflow pipe, a carburetor having an outlet pipe leading to the cylinder or cylinders of the engine, means whereby the moisture supply pipe leads into the outlet pipe between the spray nozzle of the carburetor and the throttle valve, a valve structure including a casing and valve element, said casing being connected in the moisture supply pipe, and a rod to turn the valve element and extending to the dash of the automobile.

2. Means for supplying moisture to the cylinder or cylinders of an automobile engine, comprising a radiator including a shell, an overflow pipe for the radiator shell extending into the top of the same, a moisture supply pipe leading into the radiator shell and having its intake end terminating at a substantial elevation above the intake of the overflow pipe, said moisture supply pipe having its opposite end leading into the discharge pipe of the carburetor between the spray nozzle of the carburetor and the throttle valve, a valve structure including a casing and valve element, said casing being connected in the moisture supply pipe, and a rod connected with the valve element and leading to the dash to turn the element.

3. Means for supplying moisture to the cylinder or cylinders of an automobile engine, comprising a moisture supply pipe having one end leading into the radiator shell and terminating at an elevation above the inlet end of the overflow pipe, the opposite end of the moisture supply pipe being connected with the outlet pipe of the carburetor between the spray nozzle of the carburetor and the throttle valve, a tubular valve casing having a longitudinal bore and a lateral extension provided with a transverse bore, means connecting one end of the tubular valve casing with one section of the moisture supply pipe, means connecting the lateral tubular extension with the other section of the moisture supply pipe, a valve element extending longitudinally of the tubular valve casing and having screw-threaded engagement therein and adapted to cover the longitudinal bore, and means to turn the valve element.

4. Means for supplying moisture to a cylinder or cylinders of an internal combustion engine, comprising a pipe section having one end leading into the radiator shell and terminating at an elevation above the inlet end of the overflow pipe, a valve structure including a horizontal tubular body portion having a longitudinal bore and a transverse bore, said tubular body portion having a valve seat at the outlet end of the longitudinal bore, said tubular body portion also having a longitudinally extending screw-threaded opening, a valve element having screw-threaded engagement within the screw-threaded opening and adapted to engage the valve seat, a bracket rigidly mounted upon the upper portion of the engine and having a collar receiving the tubular body portion to rigidly hold the same in place, a connecting rod secured to the screw-threaded valve element and extending to the dash, said pipe section leading into the intake end of the longitudinal bore, and a second pipe section leading into the transverse bore and connected with the outlet pipe of the carburetor between the spray nozzle of the carburetor and the throttle valve.

In testimony whereof I affix my signature.

ERNEST MILLER.